United States Patent
Park (10) Patent No.: US 9,019,125 B2
(45) Date of Patent: Apr. 28, 2015

(54) APPARATUS OF GUIDING SAFE DRIVING AT INTERSECTIONS AND METHOD OF GUIDING SAFE DRIVING USING THE SAME

(71) Applicant: Mando Corporation, Pyeongtaek-si (KR)

(72) Inventor: Man Bok Park, Seoul (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/923,365

(22) Filed: Jun. 21, 2013

(65) Prior Publication Data

US 2013/0342369 A1     Dec. 26, 2013

(30) Foreign Application Priority Data

Jun. 21, 2012 (KR) .......................... 10-2012-0066570

(51) Int. Cl.

| G08G 1/09 | (2006.01) |
| G08G 1/0967 | (2006.01) |
| G08G 1/0962 | (2006.01) |
| B60W 50/00 | (2006.01) |
| B60W 30/18 | (2012.01) |

(52) U.S. Cl.
CPC .......... *G08G 1/0967* (2013.01); *G08G 1/09623* (2013.01); *B60W 50/0097* (2013.01); *B60W 30/18154* (2013.01); *B60W 2550/22* (2013.01); *B60W 2720/10* (2013.01)

(58) Field of Classification Search
None
See application file for complete search history.

(56) References Cited

U.S. PATENT DOCUMENTS

| 6,204,778 B1 * | 3/2001 | Bergan et al. ................. 340/936 |
| 2003/0016143 A1 * | 1/2003 | Ghazarian .................... 340/901 |

FOREIGN PATENT DOCUMENTS

| EP | 2280386 A1 | 2/2011 |
| KR | 10-2011-0045762 | 5/2011 |

OTHER PUBLICATIONS

Office action dated Aug. 1, 2013 from corresponding Korean Patent Application No. 10-2012-0066570 and its English translation by Google Translate.

* cited by examiner

*Primary Examiner* — Travis Hunnings
(74) *Attorney, Agent, or Firm* — Ladas & Parry, LLP (57) ABSTRACT

Disclosed are herein an apparatus of guiding safe driving at intersections and a method of guiding safe driving using the same. The driving guiding apparatus at intersections includes an intersection condition sensing unit installed at one side of a vehicle and sensing the current conditions around an intersection, an intersection pre-entry condition calculation unit installed at the other side of the vehicle and calculating in advance current condition data before the vehicle enters the intersection based on current condition data corresponding to the current conditions around the intersection sensed by the intersection condition sensing unit, and an intersection pre-entry vehicle speed indication unit installed at the other side of the vehicle and indicating a reference vehicle speed, corresponding to the current condition data calculated by the intersection pre-entry condition calculation unit, before the vehicle enters the intersection.

8 Claims, 5 Drawing Sheets

APPARATUS OF GUIDING SAFE DRIVING AT INTERSECTIONS AND METHOD OF GUIDING SAFE DRIVING USING THE SAME

CROSS-REFERENCE TO RELATED APPLICATION

This application claims priority from Korean Patent Application No. 10-2012-0066570, filed on Jun. 21, 2012 in the Korean Intellectual Property Office, the disclosure of which is incorporated herein by reference in its entirety.

BACKGROUND

1. Field

Embodiments of the present invention relate to an apparatus of guiding safe driving at intersections and a method of guiding safe driving using the same.

2. Description of the Related Art

In general, a vehicle driving toward an intersection has to suddenly stop or brake due to traffic signals or reckless behavior of other drivers which violate the traffic laws, at the intersection.

The safety of such a vehicle driving toward an intersection is poor due to traffic signals or reckless behavior of other drivers which violate the traffic laws, at the intersection, and thus, prevention of traffic accidents at intersections needs to be addressed.

Therefore, research into an apparatus capable of safely guiding driving through intersections, which provides guidance for safe driving so that a vehicle driving toward an intersection is safely driven, thus preventing traffic accidents, and a method of guiding safe driving using the same has been proceeding.

SUMMARY

Therefore, it is an aspect of the present invention to provide an apparatus of guiding safe driving at intersections which prevents a driver from unnecessarily accelerating or suddenly braking a vehicle when driving through an intersection to guide safe driving and to prevent traffic accidents at the intersection, and a method of guiding safe driving using the same.

Additional aspects of the invention will be set forth in part in the description which follows and, in part, will be obvious from the description, or may be learned by practice of the invention.

In accordance with one aspect of the present invention, an apparatus of guiding safe driving at intersections includes an intersection condition sensing unit installed at one side of a vehicle and sensing the current conditions around an intersection, an intersection pre-entry condition calculation unit installed at the other side of the vehicle and calculating in advance current condition data before the vehicle enters the intersection based on current condition data corresponding to the current conditions around the intersection sensed by the intersection condition sensing unit, and an intersection pre-entry vehicle speed indication unit installed at the other side of the vehicle and indicating a reference vehicle speed, corresponding to the current condition data calculated by the intersection pre-entry condition calculation unit, before the vehicle enters the intersection.

The intersection pre-entry condition calculation unit may calculate a predicted time until the vehicle enters the intersection using at least one of a current traffic signal at an traffic light at the intersection, a remaining time until the next traffic signal change, a next traffic signal changed from the current traffic signal, a remaining distance to the traffic light at the intersection, a current vehicle speed, a current vehicle acceleration, and a traffic signal change time.

At least one of the intersection conditions sensing unit, the intersection pre-entry condition calculation unit, and the intersection pre-entry vehicle speed indication unit may be manufactured as an external device.

The apparatus of guiding safe driving at intersections may further include an intersection pre-entry vehicle speed confirmation unit, if a current vehicle speed is within the range of the reference vehicle speed corresponding to the current condition data indicated by the intersection pre-entry vehicle speed indication unit, confirming that the current vehicle speed is a vehicle speed at present when the vehicle will enters the intersection.

In accordance with another aspect of the present invention, a method of guiding safe driving at intersections includes sensing current conditions by sensing the current conditions around an intersection through an intersection condition sensing unit, calculating intersection pre-entry conditions by receiving current condition data corresponding to the current conditions around the intersection sensed through the intersection condition sensing unit and calculating in advance current condition data before the vehicle enters the intersection based on the current condition data corresponding to the current conditions around the intersection, through an intersection pre-entry condition calculation unit, and indicating an intersection pre-entry vehicle speed by receiving a reference vehicle speed corresponding to the current condition data calculated through the intersection pre-entry condition calculation unit and indicating the reference vehicle speed before the vehicle enters the intersection, through an intersection pre-entry vehicle speed indication unit.

In the calculation of the intersection pre-entry conditions, the intersection pre-entry condition calculation unit may calculate a predicted time until the vehicle enters the intersection using at least one of a current traffic signal at an traffic light at the intersection, a remaining time until the next traffic signal change, a next traffic signal changed from the current traffic signal, a remaining distance to the traffic light at the intersection, a current vehicle speed, a current vehicle acceleration, and a traffic signal change time.

In at least one of the sensing of the current conditions, the calculation of the intersection pre-entry conditions, and the indication of the intersection pre-entry vehicle speed, at least one of the intersection conditions sensing unit, the intersection pre-entry condition calculation unit, and the intersection pre-entry vehicle speed indication unit may be manufactured as an external device.

The method of guiding safe driving at intersections may further include, after the indication of the intersection pre-entry vehicle speed, confirming the intersection pre-entry vehicle speed by, if a current vehicle speed is within the range of the reference vehicle speed corresponding to the current condition data indicated through the intersection pre-entry vehicle speed indication unit, confirming that the current vehicle speed is a vehicle speed at present when the vehicle will enters the intersection, through an intersection pre-entry vehicle speed confirmation unit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

One Embodiment

Figure 1:
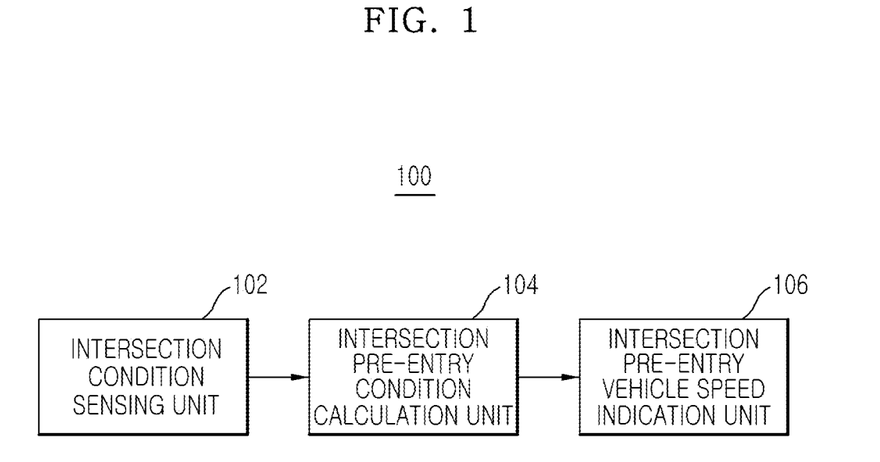
FIG. 1 is a block diagram illustrating an apparatus of guiding safe driving at intersections in accordance with one embodiment of the present invention.

FIG. 1 is a block diagram illustrating an apparatus of guiding safe driving at intersections in accordance with one embodiment of the present invention.

With reference to FIG. 1, an apparatus 100 of guiding safe driving at intersections in accordance with one embodiment of the present invention includes an intersection condition sensing unit 102, an intersection pre-entry condition calculation unit 104, and an intersection pre-entry vehicle speed indication unit 106.

The intersection condition sensing unit 102 is installed at one side of a vehicle and senses the current conditions around an intersection.

The intersection pre-entry condition calculation unit 104 is installed at the other side of the vehicle and calculates in advance current condition data before the vehicle enters the intersection based on current condition data corresponding to the current conditions around the intersection sensed by the intersection condition sensing unit 102.

Here, the intersection pre-entry condition calculation unit 104 may calculate a predicted time until the vehicle enters the intersection using at least one of a current traffic signal at an traffic light at the intersection, a remaining time until the next traffic signal change, a next traffic signal changed from the current traffic signal, a remaining distance to the traffic light at the intersection, a current vehicle speed, a current vehicle acceleration, and a traffic signal change time.

For example, the intersection pre-entry condition calculation unit 104 may calculate in advance current condition data before the vehicle enters the intersection using a table structural equation 1, a table structural equation 2 and function file structural equations 1 to 5, stated below.

First, the intersection pre-entry condition calculation unit 104 may calculate a predicted time until the vehicle enters the intersection (Time_to_Intersection) {function file structural equation 1} using remaining distance to the traffic light at the intersection, current vehicle speed, current vehicle acceleration and traffic signal change time.

$S = (Vo*\text{Time\_to\_Intersection}) + (\frac{1}{2}*\text{Acceleration}*\text{Time\_to\_Intersection}*\text{Time\_to\_Intersection})$ {Table Structural Equation 1}

Vo: current vehicle speed
Acceleration: current vehicle acceleration
S: distance to traffic light at intersection If the traffic signal is currently red and thus will change to green next, as assuming the time until change is defined as Time_to_Green and the maximum allowable speed is defined as V_Max1, the intersection pre-entry condition calculation unit 104 may recalculate (Time_to_Intersection) {function file structural equation 1} using {table structural equation 1}, {function file structural equation 2}, and {function file structural equation 3}.

Here, if (Time_to_Intersection) {function file structural equation 1}>(Time_to_Green) {function file structural equation 2}, the intersection pre-entry condition calculation unit 104 may output a signal instructing a driver to maintain the current vehicle speed.

On the other hand, if (Time_to_Intersection) {function file structural equation 1}<(Time_to_Green) {function file structural equation 2}, the intersection pre-entry condition calculation unit 104 may recalculate a time by applying a critical value which the driver may achieve, for example, $-3$ m/s$^2$, as a substitute for the current vehicle acceleration (which may be '0' because the vehicle generally drives at a constant speed), to the acceleration parameter of {table structural equation 1}, and then acquire (Time_to_Intersection_2) {function file structural equation 3}.

If (Time_to_Intersection_2) {function file structural equation 3}<(Time_to_Green) {function file structural equation 2}, the intersection pre-entry condition calculation unit 104 may output a signal instructing the driver to prepare stopping of the vehicle.

If (Time_to_Intersection_2) {function file structural formula 3}>(Time_to_Green) {function file structural formula 2}, the intersection pre-entry condition calculation unit 104 may output a signal instructing the driver to decelerate the vehicle and then to accelerate the vehicle and pass through the intersection without stopping after the traffic signal changes.

Further, if the traffic signal is currently green and thus will change to red next, on the assumption that a time until change is defined as Time_to_Red and the maximum allowable speed is defined as V_Max2, the intersection pre-entry condition calculation unit 104 may recalculate (Time_to_Intersection) {function file structural equation 1} using {table structural equation 1}, {function file structural equation 4}, and {function file structural equation 5}.

Here, if (Time_to_Intersection) {function file structural equation 1}<(Time_to_Red) {function file structural equation 4}, the intersection pre-entry condition calculation unit 104 may output a signal instructing the driver to maintain the current vehicle speed.

On the other hand, if (Time_to_Intersection) {function file structural equation 1}>(Time_to_Red) {function file structural equation 4}, the intersection pre-entry condition calculation unit 104 may recalculate the current vehicle acceleration using (V_Max2*V_MAX2−Vo*Vo)=2*acceleration*S {table structural equation 2} and then acquire (acceleration_2) {function file structural equation 5}.

If (acceleration_2) {function file structural equation 5}> the critical value (for example, 3 m/s$^2$), the intersection pre-entry condition calculation unit 104 may output a signal instructing the driver to stop the vehicle.

If (acceleration_2) {function file structural equation 5}< the critical value (for example, 3 m/s$^2$), the intersection pre-entry condition calculation unit 104 may output a signal instructing the driver to accelerate the vehicle and pass through the intersection.

The intersection pre-entry vehicle speed indication unit 106 is installed at the other side of the vehicle, and indicates a reference vehicle speed, corresponding to the current condition data calculated by the intersection pre-entry condition calculation unit 104, before the vehicle enters the intersection.

At least one of the intersection conditions sensing unit 102, the intersection pre-entry condition calculation unit 104, and the intersection pre-entry vehicle speed indication unit 106 may be manufactured as an external device (not shown), such as a navigation system.

Hereinafter, a method 200 of guiding safe driving at intersections to guide safe driving of a vehicle at an intersection using the apparatus 100 of guiding safe driving at intersections in accordance with this embodiment of the present invention will be described below with reference to FIG. 2.

Figure 2:
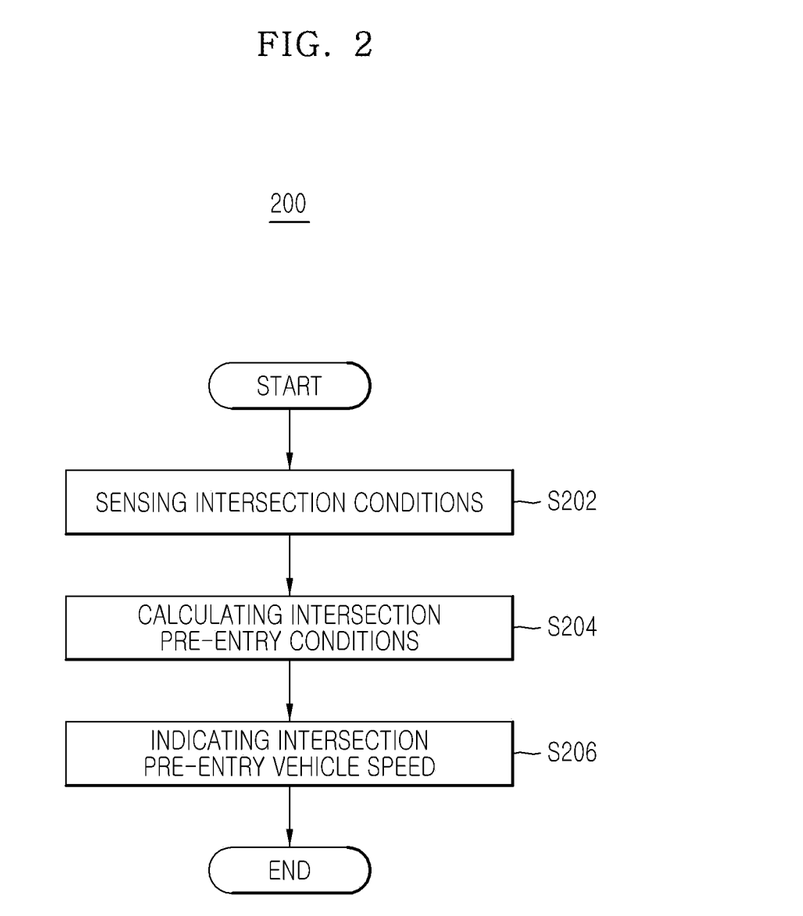
FIG. 2 is a flowchart illustrating a method of guiding safe driving at intersections in accordance with one embodiment of the present invention.

FIG. 2 is a flowchart illustrating a method of guiding safe driving at intersections in accordance with this embodiment of the present invention.

With reference to FIG. 2, the method 200 of guiding safe driving at intersections in accordance with this embodiment of the present invention includes sensing intersection conditions (Operation S202), calculating intersection pre-entry conditions (Operation S204), and indicating intersection pre-entry vehicle speed (Operation S206).

In the sensing of the intersection conditions (Operation S202), the intersection condition sensing unit 102 (with reference to FIG. 1) senses the current conditions around an intersection.

Thereafter, in the calculation of the intersection pre-entry conditions (Operation S204), the intersection pre-entry condition calculation unit 104 (with reference to FIG. 1) receives current condition data corresponding to the current conditions around the intersection sensed by the intersection condition sensing unit 102 (with reference to FIG. 1) and calculates in advance current condition data before the vehicle enters the intersection based on the current condition data corresponding to the current conditions around the intersection.

Here, in the calculation of the intersection pre-entry conditions (Operation S204), the intersection pre-entry condition calculation unit 104 (with reference to FIG. 1) may calculate a predicted time until the vehicle enters the intersection using at least one of a current traffic signal at an traffic light at the intersection, a remaining time until the next traffic signal change, a next traffic signal changed from the current traffic signal, a remaining distance to the traffic light at the intersection, a current vehicle speed, a current vehicle acceleration, and a traffic signal change time.

For example, in the calculation of the intersection pre-entry conditions (Operation S204), the intersection pre-entry condition calculation unit 104 (with reference to FIG. 1) may calculate in advance current condition data before the vehicle enters the intersection using a table structural equation 1, a table structural equation 2 and function file structural equations 1 to 5, stated below.

First, in the calculation of the intersection pre-entry conditions (Operation S204), the intersection pre-entry condition calculation unit 104 (with reference to FIG. 1) may calculate a predicted time until the vehicle enters the intersection (Time_to_Intersection) {function file structural equation 1} using remaining distance to the traffic light at the intersection, current vehicle speed, current vehicle acceleration and traffic signal change time.

$$S = (V_o * \text{Time\_to\_Intersection}) + (\tfrac{1}{2} * \text{Acceleration} * \text{Time\_to\_Intersection} * \text{Time\_to\_Intersection}) \quad \{\text{Table Structural Equation 1}\}$$

Vo: current vehicle speed
Acceleration: current vehicle acceleration
S: distance to traffic light at intersection In the calculation of the intersection pre-entry conditions (Operation S204), if the traffic signal is currently red and thus will change to green next, as assuming the time until change is defined as Time_to_Green and the maximum allowable speed is defined as V_Max1, the intersection pre-entry condition calculation unit 104 (with reference to FIG. 1) may recalculate (Time_to_Intersection) {function file structural equation 1} using {table structural equation 1}, {function file structural equation 2}, and {function file structural equation 3}.

Here, in the calculation of the intersection pre-entry conditions (Operation S204), if (Time_to_Intersection) {function file structural equation 1}>(Time_to_Green) {function file structural equation 2}, the intersection pre-entry condition calculation unit 104 (with reference to FIG. 1) may output a signal instructing a driver to maintain the current vehicle speed.

On the other hand, in the calculation of the intersection pre-entry conditions (Operation S204), if (Time_to_Intersection) {function file structural equation 1}<(Time_to_Green) {function file structural equation 2}, the intersection pre-entry condition calculation unit 104 (with reference to FIG. 1) may recalculate a time by applying a critical value which the driver may achieve, for example, −3 m/s$^2$, as a substitute for the current vehicle acceleration (which may be '0' because the vehicle generally drives at a constant speed), to the acceleration parameter of {table structural equation 1}, and then acquire (Time_to_Intersection_2) {function file structural equation 3}.

In the calculation of the intersection pre-entry conditions (Operation S204), if (Time_to_Intersection_2) {function file structural equation 3}<(Time_to_Green) {function file structural equation 2}, the intersection pre-entry condition calculation unit 104 (with reference to FIG. 1) may output a signal instructing the driver to prepare stopping of the vehicle.

In the calculation of the intersection pre-entry conditions (Operation S204), if (Time_to_Intersection_2) {function file structural formula 3}>(Time_to_Green) {function file structural formula 2}, the intersection pre-entry condition calculation unit 104 (with reference to FIG. 1) may output a signal instructing the driver to decelerate the vehicle and then to accelerate the vehicle and pass through the intersection without stopping after the traffic signal changes.

Further, in the calculation of the intersection pre-entry conditions (Operation S204), if the traffic signal is currently green and thus will change to red next, on the assumption that a time until change is defined as Time_to_Red and the maximum allowable speed is defined as V_Max2, the intersection pre-entry condition calculation unit 104 (with reference to FIG. 1) may recalculate (Time_to_Intersection) {function file structural equation 1} using {table structural equation 1}, {function file structural equation 4}, and {function file structural equation 5}.

Here, in the calculation of the intersection pre-entry conditions (Operation S204), if (Time_to_Intersection) {function file structural equation 1}<(Time_to_Red) {function file structural equation 4}, the intersection pre-entry condition calculation unit 104 (with reference to FIG. 1) may output a signal instructing the driver to maintain the current vehicle speed.

On the other hand, in the calculation of the intersection pre-entry conditions (Operation S204), if (Time_to_Intersection) {function file structural equation 1}>(Time_to_Red) {function file structural equation 4}, the intersection pre-entry condition calculation unit 104 (with reference to FIG. 1) may recalculate the current vehicle acceleration using (V_Max2*V_MAX2−Vo*Vo)=2*acceleration*S  {table structural equation 2} and then acquire (acceleration_2) {function file structural equation 5}.

In the calculation of the intersection pre-entry conditions (Operation S204), if (acceleration_2) {function file structural equation 5}> the critical value (for example, 3 m/s²), the intersection pre-entry condition calculation unit 104 (with reference to FIG. 1) may output a signal instructing the driver to stop the vehicle.

In the calculation of the intersection pre-entry conditions (Operation S204), if (acceleration_2) {function file structural equation 5}< the critical value (for example, 3 m/s²), the intersection pre-entry condition calculation unit 104 (with reference to FIG. 1) may output a signal instructing the driver to accelerate the vehicle and pass through the intersection.

Finally, in the indication of the intersection pre-entry vehicle speed (Operation S206), the intersection pre-entry vehicle speed indication unit 106 (with reference to FIG. 1) receives a reference vehicle speed corresponding to the current condition data calculated by the intersection pre-entry condition calculation unit 104 (with reference to FIG. 1) and indicates the reference vehicle speed before the vehicle enters the intersection.

In at least one of the sensing of the intersection conditions (Operation S202), the calculation of the intersection pre-entry conditions (Operation S204), and the indication of the intersection pre-entry vehicle speed (Operation S206), at least one of the intersection conditions sensing unit 102 (with reference to FIG. 1), the intersection pre-entry condition calculation unit 104 (with reference to FIG. 1), and the intersection pre-entry vehicle speed indication unit 106 (with reference to FIG. 1) may be manufactured as an external device (not shown), such as a navigation system.

As described above, the apparatus 100 of guiding safe driving at intersections and the method 200 of guiding safe driving using the same in accordance with this embodiment of the present invention include the intersection condition sensing unit 102, the intersection pre-entry condition calculation unit 104, and the intersection pre-entry vehicle speed indication unit 106.

Therefore, the apparatus 100 of guiding safe driving at intersections and the method 200 of guiding safe driving using the same in accordance with this embodiment of the present invention may prevent a driver driving a vehicle toward an intersection from unnecessarily accelerating or suddenly braking the vehicle and thus guide safe driving, thereby preventing traffic accidents at the intersection.

Another Embodiment

Figure 3:
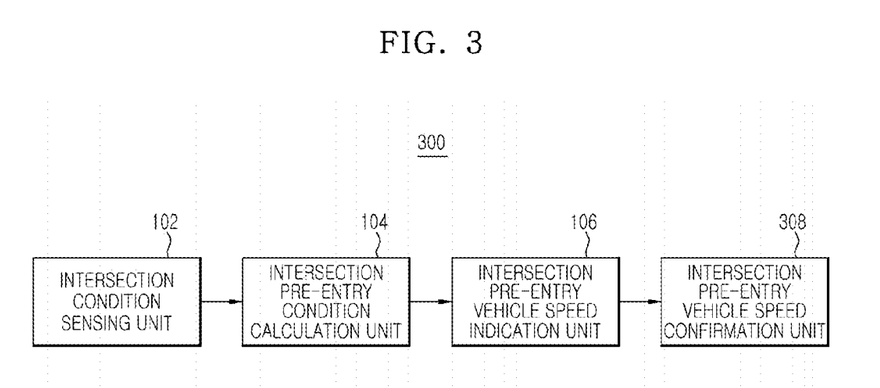
FIG. 3 is a block diagram illustrating an apparatus of guiding safe driving at intersections in accordance with another embodiment of the present invention.

FIG. 3 is a block diagram illustrating an apparatus of guiding safe driving at intersections in accordance with another embodiment of the present invention.

With reference to FIG. 3, in the same manner as the apparatus 100 of guiding safe driving in accordance with the embodiment shown in FIG. 1, an apparatus 300 of guiding safe driving at intersections in accordance with this embodiment of the present invention includes an intersection condition sensing unit 102, an intersection pre-entry condition calculation unit 104, and an intersection pre-entry vehicle speed indication unit 106.

Functions of the respective elements and organic connections between the elements of the apparatus 300 of guiding safe driving at intersections in accordance with this embodiment shown in FIG. 3 are the same as functions of the respective elements and organic connections between the elements of the apparatus 100 of guiding safe driving at intersections in accordance with the former embodiment shown in FIG. 1, and a detailed description thereof will thus be omitted.

The apparatus 300 of guiding safe driving at intersections in accordance with this embodiment of the present invention further includes an intersection pre-entry vehicle speed confirmation unit 308.

That is, if a current vehicle speed is within the range of a reference vehicle speed corresponding to current condition data indicated by the intersection pre-entry vehicle speed indication unit 106, the intersection pre-entry vehicle speed confirmation unit 308 confirms that the current vehicle speed is a vehicle speed at present when the vehicle will enters the intersection.

Hereinafter, a method 400 or 500 of guiding safe driving at intersections to guide safe driving of a vehicle at an intersection using the apparatus 300 of guiding safe driving at intersections in accordance with this embodiment of the present invention will be described below with reference to FIGS. 4 and 5.

Figure 4:
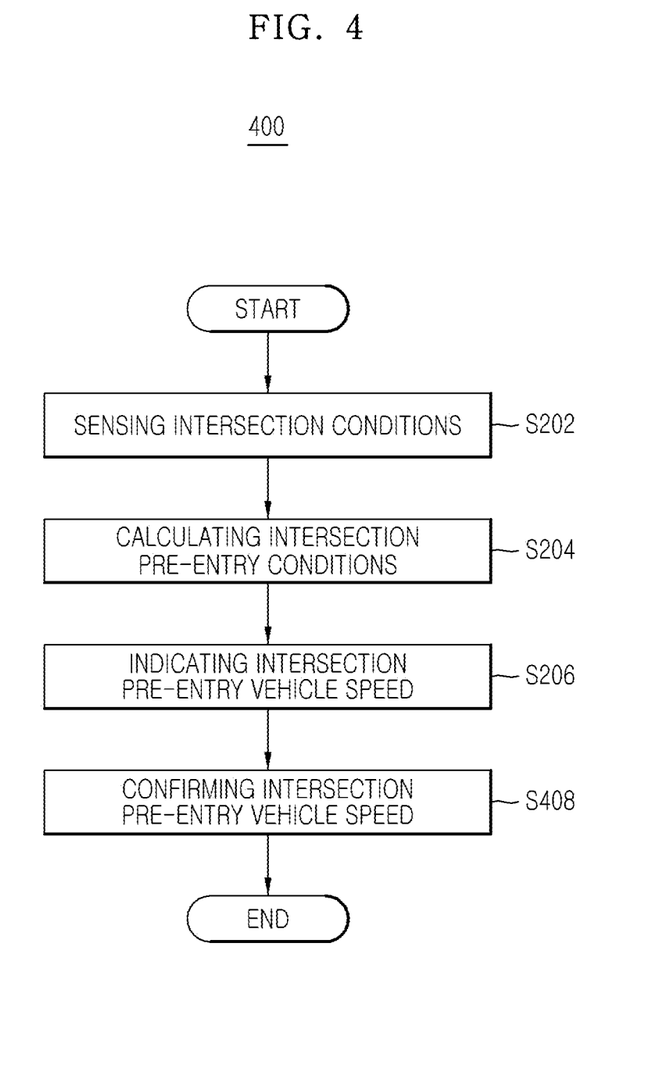
FIG. 4 is a flowchart illustrating a method of guiding safe driving at intersections in accordance with another embodiment of the present invention.
Figure 5:
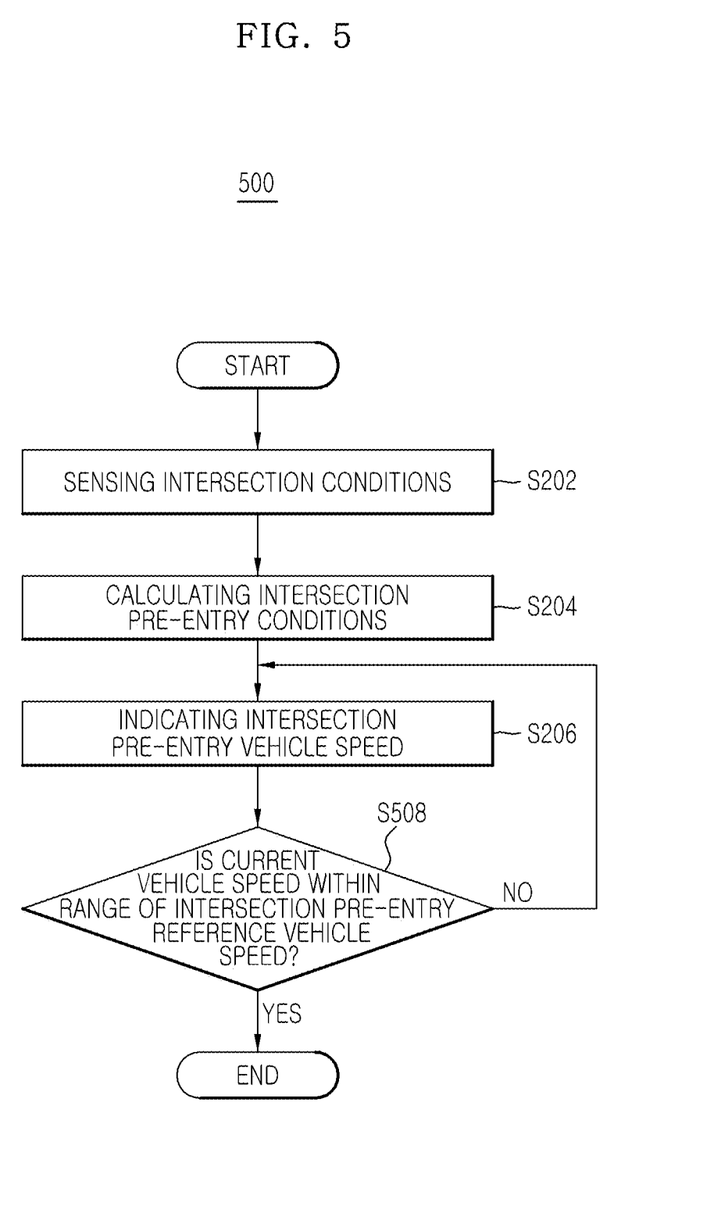
FIG. 5 is a flowchart illustrating one example of the method of guiding safe driving at intersections in accordance with another embodiment of the present invention.

FIG. 4 is a flowchart illustrating a method of guiding safe driving at intersections in accordance with this embodiment of the present invention, and FIG. 5 is a flowchart illustrating one example of the method of guiding safe driving at intersections in accordance with this embodiment of the present invention.

With reference to FIGS. 4 and 5, the method 400 or 500 of guiding safe driving at intersections in accordance with this embodiment of the present invention includes sensing intersection conditions (Operation S202), calculating intersection pre-entry conditions (Operation S204), indicating intersection pre-entry vehicle speed (Operation S206), and confirming the intersection pre-entry vehicle speed (Operation S408 or S508).

In the sensing of the intersection conditions (Operation S202), the intersection condition sensing unit 102 (with reference to FIG. 3) senses the current conditions around an intersection.

Thereafter, in the calculation of the intersection pre-entry conditions (Operation S204), the intersection pre-entry condition calculation unit 104 (with reference to FIG. 3) receives current condition data corresponding to the current conditions around the intersection sensed by the intersection condition sensing unit 102 (with reference to FIG. 1) and calculates in advance current condition data before the vehicle enters the intersection based on the current condition data corresponding to the current conditions around the intersection.

Here, in the calculation of the intersection pre-entry conditions (Operation S204), the intersection pre-entry condition calculation unit 104 (with reference to FIG. 3) may calculate a predicted time until the vehicle enters the intersection using at least one of a current traffic signal at an traffic light at the intersection, a remaining time until the next traffic signal change, a next traffic signal changed from the current traffic signal, a remaining distance to the traffic light at the intersection, a current vehicle speed, a current vehicle acceleration, and a traffic signal change time.

For example, in the calculation of the intersection pre-entry conditions (Operation S204), the intersection pre-entry condition calculation unit 104 (with reference to FIG. 3) may calculate in advance current condition data before the vehicle enters the intersection using a table structural equation 1, a table structural equation 2 and function file structural equations 1 to 5, stated below.

First, in the calculation of the intersection pre-entry conditions (Operation S204), the intersection pre-entry condition calculation unit 104 (with reference to FIG. 3) may calculate a predicted time until the vehicle enters the intersection (Time_to_Intersection) {function file structural equation 1} using remaining distance to the traffic light at the intersection, current vehicle speed, current vehicle acceleration and traffic signal change time.

$$S=(V_o * \text{Time\_to\_Intersection}) + (\tfrac{1}{2} * \text{Acceleration} * \text{Time\_to\_Intersection} * \text{Time\_to\_Intersection})$$
{Table Structural Equation 1}

Vo: current vehicle speed
Acceleration: current vehicle acceleration
S: distance to traffic light at intersection In the calculation of the intersection pre-entry conditions (Operation S204), if the traffic signal is currently red and thus will change to green next, as assuming the time until change is defined as Time_to_Green and the maximum allowable speed is defined as V_Max1, the intersection pre-entry condition calculation unit 104 (with reference to FIG. 3) may recalculate (Time_to_Intersection) {function file structural equation 1} using {table structural equation 1}, {function file structural equation 2}, and {function file structural equation 3}.

Here, in the calculation of the intersection pre-entry conditions (Operation S204), if (Time_to_Intersection) {function file structural equation 1}>(Time_to_Green) {function file structural equation 2}, the intersection pre-entry condition calculation unit 104 (with reference to FIG. 3) may output a signal instructing a driver to maintain the current vehicle speed.

On the other hand, in the calculation of the intersection pre-entry conditions (Operation S204), if (Time_to_Intersection) {function file structural equation 1}<(Time_to_Green) {function file structural equation 2}, the intersection pre-entry condition calculation unit 104 (with reference to FIG. 3) may recalculate a time by applying a critical value which the driver may achieve, for example, −3 m/s², as a substitute for the current vehicle acceleration (which may be '0' because the vehicle generally drives at a constant speed), to the acceleration parameter of {table structural equation 1}, and then acquire (Time_to_Intersection_2) {function file structural equation 3}.

In the calculation of the intersection pre-entry conditions (Operation S204), if (Time_to_Intersection_2) {function file structural equation 3}<(Time_to_Green) {function file structural equation 2}, the intersection pre-entry condition calculation unit 104 (with reference to FIG. 3) may output a signal instructing the driver to prepare stopping of the vehicle.

In the calculation of the intersection pre-entry conditions (Operation S204), if (Time_to_Intersection_2) {function file structural formula 3}>(Time_to_Green) {function file structural formula 2}, the intersection pre-entry condition calculation unit 104 (with reference to FIG. 3) may output a signal instructing the driver to decelerate the vehicle and then to accelerate the vehicle and pass through the intersection without stopping after the traffic signal changes.

Further, in the calculation of the intersection pre-entry conditions (Operation S204), if the traffic signal is currently green and thus will change to red next, on the assumption that a time until change is defined as Time_to_Red and the maximum allowable speed is defined as V_Max2, the intersection pre-entry condition calculation unit 104 (with reference to FIG. 3) may recalculate (Time_to_Intersection) {function file structural equation 1} using {table structural equation 1}, {function file structural equation 4}, and {function file structural equation 5}.

Here, in the calculation of the intersection pre-entry conditions (Operation S204), if (Time_to_Intersection) {function file structural equation 1}<(Time_to_Red) {function file structural equation 4}, the intersection pre-entry condition calculation unit 104 (with reference to FIG. 3) may output a signal instructing the driver to maintain the current vehicle speed.

On the other hand, in the calculation of the intersection pre-entry conditions (Operation S204), if (Time_to_Intersection) {function file structural equation 1}>(Time_to_Red) {function file structural equation 4}, the intersection pre-entry condition calculation unit 104 (with reference to FIG. 3) may recalculate the current vehicle acceleration using (V_Max2*V_MAX2−Vo*Vo)=2*acceleration*S {table structural equation 2} and then acquire (acceleration_2) {function file structural equation 5}.

In the calculation of the intersection pre-entry conditions (Operation S204), if (acceleration_2) {function file structural equation 5}> the critical value (for example, 3 m/s²), the intersection pre-entry condition calculation unit 104 (with reference to FIG. 3) may output a signal instructing the driver to stop the vehicle.

In the calculation of the intersection pre-entry conditions (Operation S204), if (acceleration_2) {function file structural equation 5}< the critical value (for example, 3 m/s²), the intersection pre-entry condition calculation unit 104 (with reference to FIG. 3) may output a signal instructing the driver to accelerate the vehicle and pass through the intersection.

Thereafter, in the indication of the intersection pre-entry vehicle speed (Operation S206), the intersection pre-entry vehicle speed indication unit 106 (with reference to FIG. 3) receives a reference vehicle speed corresponding to the current condition data calculated by the intersection pre-entry condition calculation unit 104 (with reference to FIG. 1) and indicates the reference vehicle speed before the vehicle enters the intersection.

Finally, in the confirmation of the intersection pre-entry vehicle speed (Operation S408 or S508), if a current vehicle speed is within the range of the reference vehicle speed corresponding to the current condition data indicated by the intersection pre-entry vehicle speed indication unit 106 (with reference to FIG. 3), the intersection pre-entry vehicle speed confirmation unit 308 (with reference to FIG. 3) confirms that the current vehicle speed is a vehicle speed at present when the vehicle will enters the intersection.

In at least one of the sensing of the intersection conditions (Operation S202), the calculation of the intersection pre-entry conditions (Operation S204), the indication of the intersection pre-entry vehicle speed (Operation S206), and the confirmation of the intersection pre-entry vehicle speed (Operation S408 or S508), at least one of the intersection conditions sensing unit 102 (with reference to FIG. 3), the intersection pre-entry condition calculation unit 104 (with reference to FIG. 3), the intersection pre-entry vehicle speed indication unit 106 (with reference to FIG. 3), and the intersection pre-entry vehicle speed confirmation unit 308 (with reference to FIG. 3) may be manufactured as an external device (not shown), such as a navigation system.

As described above, the apparatus 300 of guiding safe driving at intersections and the method 400 or 500 of guiding safe driving using the same in accordance with this embodiment of the present invention include the intersection condition sensing unit 102, the intersection pre-entry condition calculation unit 104, and the intersection pre-entry vehicle speed indication unit 106.

Therefore, the apparatus 300 of guiding safe driving at intersections and the method 400 or 500 of guiding safe driving using the same in accordance with this embodiment of the present invention may prevent a driver driving a vehicle toward an intersection from unnecessarily accelerating or suddenly braking the vehicle and thus guide safe driving, thereby preventing traffic accidents at the intersection.

Further, the apparatus 300 of guiding safe driving at intersections and the method 400 or 500 of guiding safe driving using the same in accordance with this embodiment of the present invention include the intersection pre-entry vehicle speed confirmation unit 308.

Therefore, the apparatus 300 of guiding safe driving at intersections and the method 400 or 500 of guiding safe driving using the same in accordance with this embodiment of the present invention may confirm that the current vehicle speed is the vehicle speed at present when the vehicle will enters the intersection, thereby more effectively preventing traffic accidents at the intersection.

As is apparent from the above description, an apparatus of guiding safe driving at intersections and a method of guiding safe driving using the same in accordance with one embodiment of the present invention may exhibit effects, as follows.

The apparatus of guiding safe driving at intersections and the method of guiding safe driving using the same may prevent a driver driving a vehicle toward an intersection from unnecessarily accelerating or suddenly braking the vehicle and thus guide safe driving, thereby preventing traffic accidents at the intersection.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus of guiding safe driving at intersections comprising:
    an intersection condition sensing unit sensing current conditions around an intersection;
    an intersection pre-entry condition calculation unit calculating in advance current condition data before a vehicle enters the intersection based on current condition data corresponding to the current conditions around the intersection sensed by the intersection condition sensing unit; and
    an intersection pre-entry vehicle speed indication unit indicating a reference vehicle speed, corresponding to the current condition data calculated by the intersection pre-entry condition calculation unit, before the vehicle enters the intersection,
    wherein the intersection condition sensing unit, the intersection pre-entry condition calculation unit and the intersection pre-entry vehicle speed indication unit are installed in the vehicle.

2. The apparatus of guiding safe driving at intersections according to claim 1, wherein the intersection pre-entry condition calculation unit calculates a predicted time until the vehicle enters the intersection using at least one of a current traffic signal at an traffic light at the intersection, a remaining time until the next traffic signal change, a next traffic signal changed from the current traffic signal, a remaining distance to the traffic light at the intersection, a current vehicle speed, a current vehicle acceleration, and a traffic signal change time.

3. The apparatus of guiding safe driving at intersections according to claim 1, wherein at least one of the intersection conditions sensing unit, the intersection pre-entry condition calculation unit, and the intersection pre-entry vehicle speed indication unit is manufactured as an external device.

4. The apparatus of guiding safe driving at intersections according to claim 1, further comprising an intersection pre-entry vehicle speed confirmation unit, if a current vehicle speed is within the range of the reference vehicle speed corresponding to the current condition data indicated by the intersection pre-entry vehicle speed indication unit, confirming that the current vehicle speed is a vehicle speed at present when the vehicle will enters the intersection.

5. A method of guiding safe driving at intersections comprising:
    sensing current conditions around an intersection through an intersection condition sensing unit;
    calculating intersection pre-entry conditions by receiving current condition data corresponding to the current conditions around the intersection sensed through the intersection condition sensing unit and calculating in advance current condition data before a vehicle enters the intersection based on the current condition data corresponding to the current conditions around the intersection, through an intersection pre-entry condition calculation unit; and
    indicating an intersection pre-entry vehicle speed by receiving a reference vehicle speed corresponding to the current condition data calculated through the intersection pre-entry condition calculation unit and indicating the reference vehicle speed before the vehicle enters the intersection, through an intersection pre-entry vehicle speed indication unit,
    wherein the intersection condition sensing unit, the intersection pre-entry condition calculation unit and the intersection pre-entry vehicle speed indication unit are installed in the vehicle.

6. The method of guiding safe driving at intersections according to claim 5, wherein, in the calculation of the intersection pre-entry conditions, the intersection pre-entry condition calculation unit calculates a predicted time until the vehicle enters the intersection using at least one of a current traffic signal at an traffic light at the intersection, a remaining time until the next traffic signal change, a next traffic signal changed from the current traffic signal, a remaining distance to the traffic light at the intersection, a current vehicle speed, a current vehicle acceleration, and a traffic signal change time.

7. The method of guiding safe driving at intersections according to claim 5, wherein, in at least one of the sensing of the current conditions, the calculation of the intersection pre-entry conditions, and the indication of the intersection pre-entry vehicle speed, at least one of the intersection conditions sensing unit, the intersection pre-entry condition calculation unit, and the intersection pre-entry vehicle speed indication unit is manufactured as an external device.

8. The method of guiding safe driving at intersections according to claim 5, further comprising, after the indication of the intersection pre-entry vehicle speed, confirming the intersection pre-entry vehicle speed by, if a current vehicle speed is within the range of the reference vehicle speed corresponding to the current condition data indicated through the intersection pre-entry vehicle speed indication unit, confirming that the current vehicle speed is a vehicle speed at present when the vehicle will enters the intersection, through an intersection pre-entry vehicle speed confirmation unit.

* * * * *